United States Patent
Kim et al.

(10) Patent No.: US 8,045,507 B2
(45) Date of Patent: Oct. 25, 2011

(54) METHOD AND APPARATUS FOR PROCESSING UPLINK DATA BY DRX-MODE TERMINAL IN MOBILE TELECOMMUNICATION SYSTEM

(75) Inventors: Soeng-Hun Kim, Suwon-si (KR); Gert Jan Van Lieshout, Staines (GB)

(73) Assignee: Samsung Electronics Co., Ltd. (KR)

( * ) Notice: Subject to any disclaimer, the term of this patent is extended or adjusted under 35 U.S.C. 154(b) by 958 days.

(21) Appl. No.: 11/972,722

(22) Filed: Jan. 11, 2008

(65) Prior Publication Data

US 2008/0198795 A1 Aug. 21, 2008

(30) Foreign Application Priority Data

Jan. 15, 2007 (KR) .................. 10-2007-0004232
Aug. 8, 2007 (KR) .................. 10-2007-0079598

(51) Int. Cl.
*H04B 7/185* (2006.01)
*H04W 4/00* (2009.01)

(52) U.S. Cl. ................... 370/328; 370/318; 370/335

(58) Field of Classification Search .................. 370/318, 370/328, 335
See application file for complete search history.

(56) References Cited

U.S. PATENT DOCUMENTS

| | | | |
|---|---|---|---|
| 2006/0068780 A1* | 3/2006 | Dalsgaard et al. | 455/432.3 |
| 2007/0133479 A1* | 6/2007 | Montojo et al. | 370/335 |
| 2007/0230400 A1* | 10/2007 | Kuchibhotla et al. | 370/331 |
| 2007/0291728 A1* | 12/2007 | Dalsgaard et al. | 370/347 |
| 2007/0291729 A1* | 12/2007 | Dalsgaard et al. | 370/347 |
| 2008/0090573 A1* | 4/2008 | Kim et al. | 455/436 |
| 2008/0293426 A1* | 11/2008 | Kim et al. | 455/450 |
| 2010/0014429 A1* | 1/2010 | Kim et al. | 370/241 |
| 2010/0182942 A1* | 7/2010 | Kim et al. | 370/311 |

* cited by examiner

*Primary Examiner* — Kenny Lin
(74) *Attorney, Agent, or Firm* — The Farrell Law Firm, P.C.

(57) ABSTRACT

Disclosed is a method and apparatus for transmitting uplink data by a terminal performing a DRX operation in a mobile telecommunication system. According to the method and apparatus, when a UE transmits the uplink data, the UE variably controls given active and sleep periods in consideration of whether or not retransmission for the uplink data is performed, thereby more flexibly operating in the DRX mode.

4 Claims, 12 Drawing Sheets

METHOD AND APPARATUS FOR PROCESSING UPLINK DATA BY DRX-MODE TERMINAL IN MOBILE TELECOMMUNICATION SYSTEM

PRIORITY

This application claims priority to an application entitled "Method and Apparatus for Processing Uplink Data by DRX-Mode Terminal in Mobile Telecommunication System" filed in the Korean Industrial Property Office on Jan. 15, 2007 and Aug. 8, 2007, and assigned Serial Nos. 2007-0004232 and 2007-0079598 respectively, the contents of which are hereby incorporated by reference.

BACKGROUND OF THE INVENTION

1. Field of the Invention

The present invention relates to a mobile telecommunication system, and more particularly to a method and apparatus for processing uplink data by a terminal performing a discontinuous reception (DRX) mode operation in a mobile telecommunication system.

2. Description of the Related Art

The universal mobile telecommunication service (UMTS) system is a $3^{rd}$ generation asynchronous mobile telecommunication system which is based on European mobile telecommunication systems, that is, GSM (Global System for Mobile Communications) and GPRS (General Packet Radio Services), and uses a CDMA (Code Division Multiple Access) scheme.

As a way to reduce terminal power consumption, the conventional $3^{rd}$ generation mobile telecommunication system employs a discontinuous reception (DRX) mode in which a terminal transitions to an idle state when it has no data to transmit/receive, and discontinuously receives a paging message in the idle state. In other words, the terminal wakes up, that is, powers on its transceiver, at a predefined time, and monitors a paging channel. If the terminal receives a paging message over the paging channel, it transitions to a connection state. However, if the terminal receives no paging message, it powers off its transceiver, and maintains a sleep state until the next wakeup time.

The reason why the DRX mode is applied to a conventional idle-mode terminal is that the conventional mobile telecommunication system centers on a voice call, and thus the terminal stays in a connection state only for a relatively short time.

However, an evolved mobile telecommunication system, such as LTE (Long Term Evolution) that is currently under discussion, is expected to provide a terminal with a packet service, as well as the voice call. The terminal that is provided with the packet service may stay in a connection state for a relatively long time, and a problem to be solved in the evolved mobile telecommunication system is to minimize the power consumption of the terminal that may stay in a connection state for such a long time.

In the evolve mobile telecommunication system, therefore, a network may appropriately set up the DRX mode in consideration of the characteristics of services supported to a terminal that is in a connection state.

FIG. 1 illustrates the concept of a DRX operation.

Referring to FIG. 1, the DRX operation generally included the following elements:

Active State (or Active Period): A period during which a receiver of a terminal is turned on. In the active state, the terminal checks if there is downlink data, and receives data when the downlink data exists.

Sleep State (or Sleep Period): A period during which a receiver of a terminal is turned off. It is established for the minimization of terminal power consumption.

DRX Cycle Length 110, 120: A length between an active period and the next active period.

Since the DRX operation as mentioned above is aimed at receiving data while minimizing terminal power consumption, the beginning and end of an active state is defined in connection with data reception. That is, the beginning point of an active state, the end point of an active state, etc. are determined by considering a data reception time, the amount of received data, and so forth.

In addition, uplink data may occur in a terminal that is in the above-mentioned DRX operation. A description will be given of how the DRX operation is affected by the uplink data occurring in a terminal that is in the DRX operation, with reference to FIG. 2.

Referring to FIG. 2, reference numeral "a" shows that a terminal performs a DRX operation consisting of active states 205, 210, 215 and 217 and sleep states.

Reference numeral "b" shows that when the terminal should perform a transmission operation according to the occurrence of uplink data in the terminal performing the DRX operation (as designated by reference numeral "220"), it must transition to an active state and perform the transmission operation 225 although it is in a sleep state of the DRX operation at a corresponding time.

Also, in response to the transmission operation 225, the transmission operation may be accompanied with an operation of transmitting an ACKnowledgement (ACK)/Non-ACKnowledgement (NACK) signal according to a Hybrid Automatic Repeat Request (HARQ).

When the HARQ operation is performed, the terminal maintains an active state so as to receive from a base station the ACK/NACK signal, which indicates whether or not the reception of the uplink data is erroneous.

Consequently, a period during which the terminal actually stays in an active state can be defined by the summation of active state periods of the DRX operation and an active state period for the transmission operation, as represented by reference numeral "c".

For example, it is assumed that active state periods 205, 210, 215 and 217 for downlink data reception are established for any terminal, and uplink data occurs at a certain time "e" belonging to a sleep state period, according to which the terminal transitions to an active state (as designated by reference numeral "225"), and then maintains the active state until a time "f".

Thus, the actual overall active state period of the terminal corresponds to the summation of the active state periods for data reception and the active state period for data transmission 230, 235, 240 and 245.

With regard to this, in order to ensure the efficiency of the DRX operation when the terminal transitions to the active state for data transmission, as described above, it is very important to define when the terminal ends the active state.

In the conventional mobile telecommunication system, such as the UMTS system, once a terminal transitions to an active state for uplink data transmission, the terminal maintains the active state until the receipt of a separate instruction from the network. That is, the terminal ends the active state and resumes the DRX operation under the control of the network.

In addition, the DRX operation in the conventional UMTS system targets an idle-mode terminal that is not accompanied by substantial data transmission/reception.

However, in the evolved mobile telecommunication system that is newly discussed based the UMTS system, a connection-mode terminal performs a DRX operation in correspondence to the packet service. This DRX operation is quite different from that of an idle-mode terminal accompanied by no data transmission/reception.

SUMMARY OF THE INVENTION

In the context of the above description, that is, in view of the minimization of power consumption, it is not desirable to keep a connection-mode terminal in an active state when uplink data occurs in the connection-mode terminal that performs the DRX operation.

Therefore, when a connection-mode terminal performs a discontinuous transmission/reception operation in the evolve mobile telecommunication system, it is necessary to newly define an active state according to uplink data occurrence. That is, in the evolved mobile telecommunication system, there is an urgent need to propose a way for a terminal to more efficiently consume power by defining an active state according to terminal modes and performing the discontinuous transmission/reception operation of the terminal, corresponding to the defined active state.

Accordingly, the present invention has been made to solve at least the above-mentioned problems occurring in the prior art, and the present invention provides a method and an apparatus for transmitting uplink data and supporting a DRX operation in a mobile telecommunication system.

Further, the present invention provides a method and apparatus for efficiently controlling terminal power consumption by allowing a connection-mode terminal to variably establish an active state according to uplink data occurrence in a mobile telecommunication system.

Further, the present invention provides a method and apparatus for informing a network of uplink data transmission and sleep state resumption by a connection-mode terminal in a mobile telecommunication system.

In accordance with an aspect of the present invention, there is provided a method of transmitting uplink data by a terminal performing a DRX operation in a mobile telecommunication system, the method includes, as the uplink data occurs, suspending the DRX operation, and transmitting the uplink data; and resuming the DRX operation at a given time according to whether or not the last data of the transmitted uplink data leads to downlink data reception.

In accordance with another aspect of the present invention, there is provided a method of transmitting uplink data by a terminal performing a DRX operation in a mobile telecommunication system, the method includes as the uplink data occurs, suspending the DRX operation, and transmitting the uplink data; informing a base station of whether or not the last data of the uplink data is transmitted; setting a different DRX cycle length according to whether or not the transmitted last data leads to downlink data reception; and resuming the DRX operation corresponding to the differently set DRX cycle length.

In accordance with yet another aspect of the present invention, there is provided a method of transmitting uplink data by a terminal performing a DRX operation in a mobile telecommunication system, the method includes as the uplink data occurs, suspending the DRX operation, and transmitting the uplink data; informing a base station of whether or not the last data of the uplink data is transmitted; determining whether or not to drive a timer and a timer value in a manner corresponding to a logical channel over which the last data is transmitted; and driving the timer set for the logical channel according to whether or not the timer is determined to be driven, and monitoring whether or not data is received or resuming the DRX operation.

In accordance with still yet another aspect of the present invention, there is provided a method of transmitting uplink data by a terminal performing a DRX operation in a mobile telecommunication system, the method includes as the uplink data occurs, suspending the DRX operation, and transmitting the uplink data; informing a base station of whether or not the last data of the uplink data is transmitted; setting a different DRX cycle length according to the type of a logical channel to which the last transmitted data belongs; and resuming the DRX operation corresponding to the set DRX cycle length.

In accordance with still yet another aspect of the present invention, there is provided a method of transmitting uplink data by a terminal performing a DRX operation in a mobile telecommunication system, the method includes as the uplink data occurs, suspending the DRX operation, and transmitting the uplink data; after the last data of the uplink data is transmitted, driving a timer when allocated a transmission resource over which to transmit control information on completion of transmitting the last data; informing a base station of the control information on completion of transmitting the last data over the allocated transmission resource; and resuming the DRX operation immediately or at a point of time when the timer expires according to whether or not the last data of the transmitted uplink data leads to downlink data reception.

In accordance with still yet another aspect of the present invention, there is provided a terminal apparatus for transmitting uplink data during a DRX operation in a mobile telecommunication system, the terminal apparatus includes at least one Radio Link Control (RLC) block for receiving data transferred from an upper layer, and reconstructing the received data into packets with a given transfer unit size; a Media Access Control (MAC) block for checking if retransmission requests for the packets with the given transfer unit size, which are transferred from the RLC block, are received, and multiplexing and transmitting the packets; a transceiver block for processing transmission/reception of the uplink data transmitted from the MAC block; and a DRX controller block for driving the transceiver block to thereby transmit the uplink data when the uplink data occurs, and turning off the transceiver block at a given time in correspondence to the last data of the transmitted uplink data to thereby resume the DRX operation.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted when it may make the subject matter of the present invention rather unclear. Further, various specific definitions found in the following description are provided only to help general understanding of the present invention, and it is apparent to those skilled in the art that the present invention can be implemented without such definitions.

By way of example, the present invention will be described in connection with the LTE system that is newly proposed as an evolved mobile telecommunication system based on the $3^{rd}$ generation asynchronous mobile telecommunication system. The present invention to be described below may be applied to other mobile telecommunication systems employing a DRX operation. Also, the present invention may be applied to mobile telecommunication systems employing base station signaling.

In addition, the present invention may also be applied to mobile telecommunication systems supporting uplink services. Moreover, the present invention may also be applied to mobile telecommunication systems employing Automatic Repeat Request (ARQ) and Hybrid ARQ (HARQ).

The present invention provides a method and apparatus for suspending a discontinuous reception (DRX) operation when uplink data occurs in a terminal that is in the DRX operation, transmitting the uplink data, resuming at the most appropriate time according to the characteristic of the transmitted data, and then informing a network of the resumption of the DRX operation.

More specially, in the present invention, a terminal performing a DRX operation transitions to an active state so as to transmit uplink data, transmits the uplink data, and then appropriately sets the end point of the active state according to the characteristic of the transmitted uplink data. Also, the terminal informs a base station of the set end point of the active state.

Figure 1:
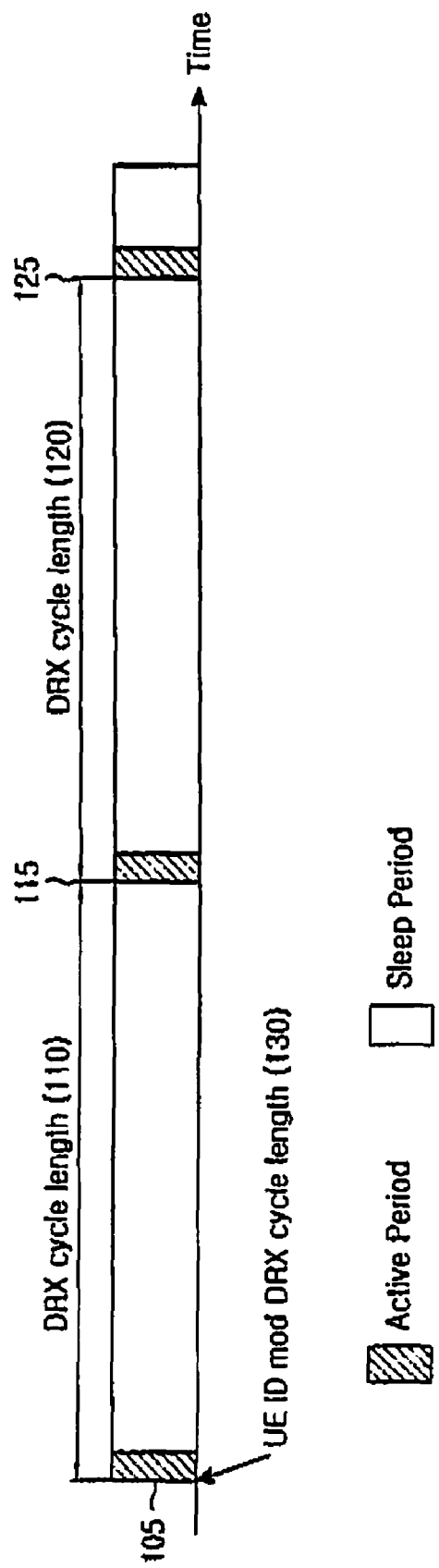
FIG. 1 is a diagram explaining the concept of a DRX operation.
Figure 2:
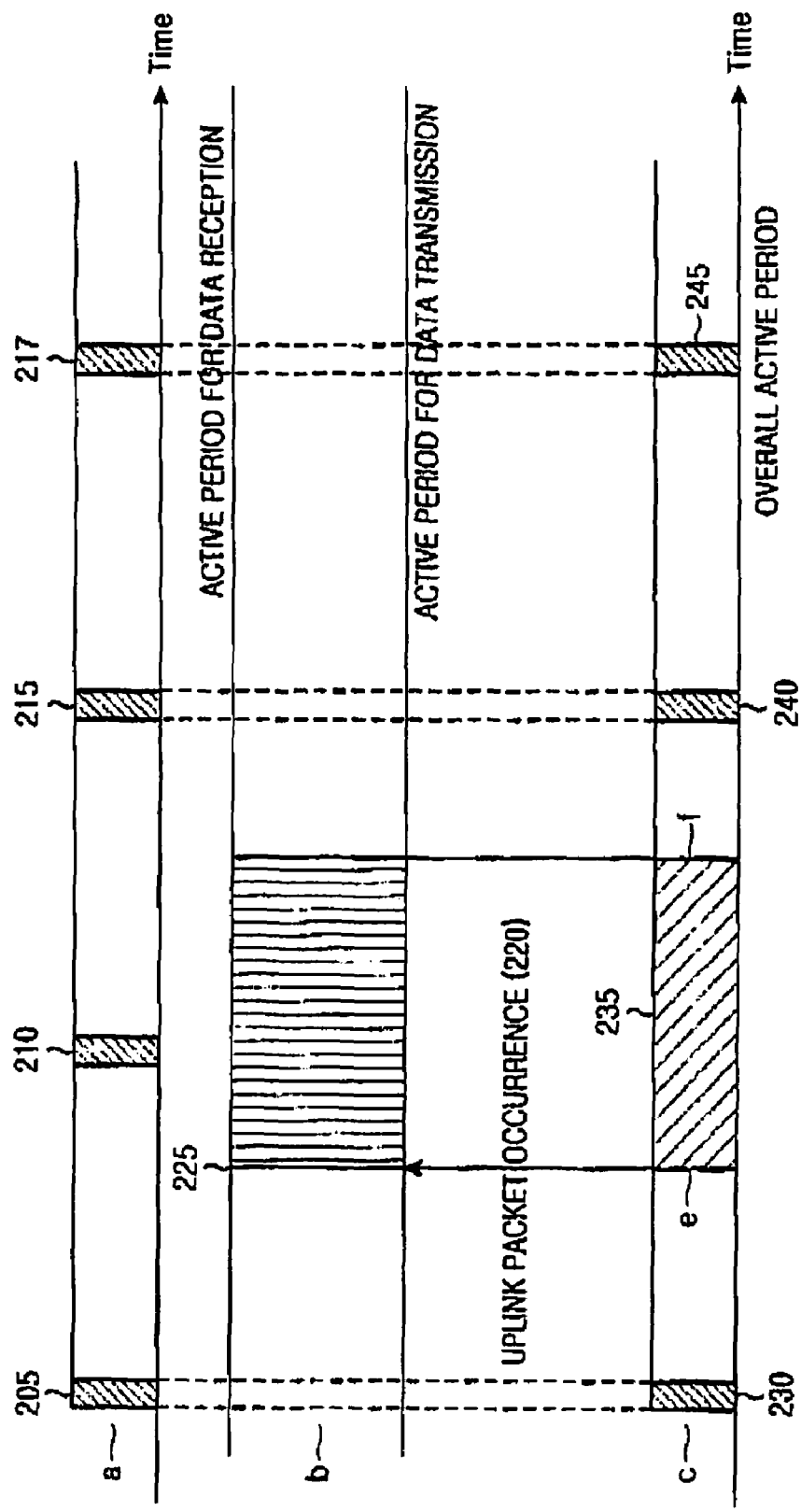
FIG. 2 is a diagram illustrating how a DRX operation is affected by uplink data that occurs in a terminal performing the DRX operation.
Figure 3:
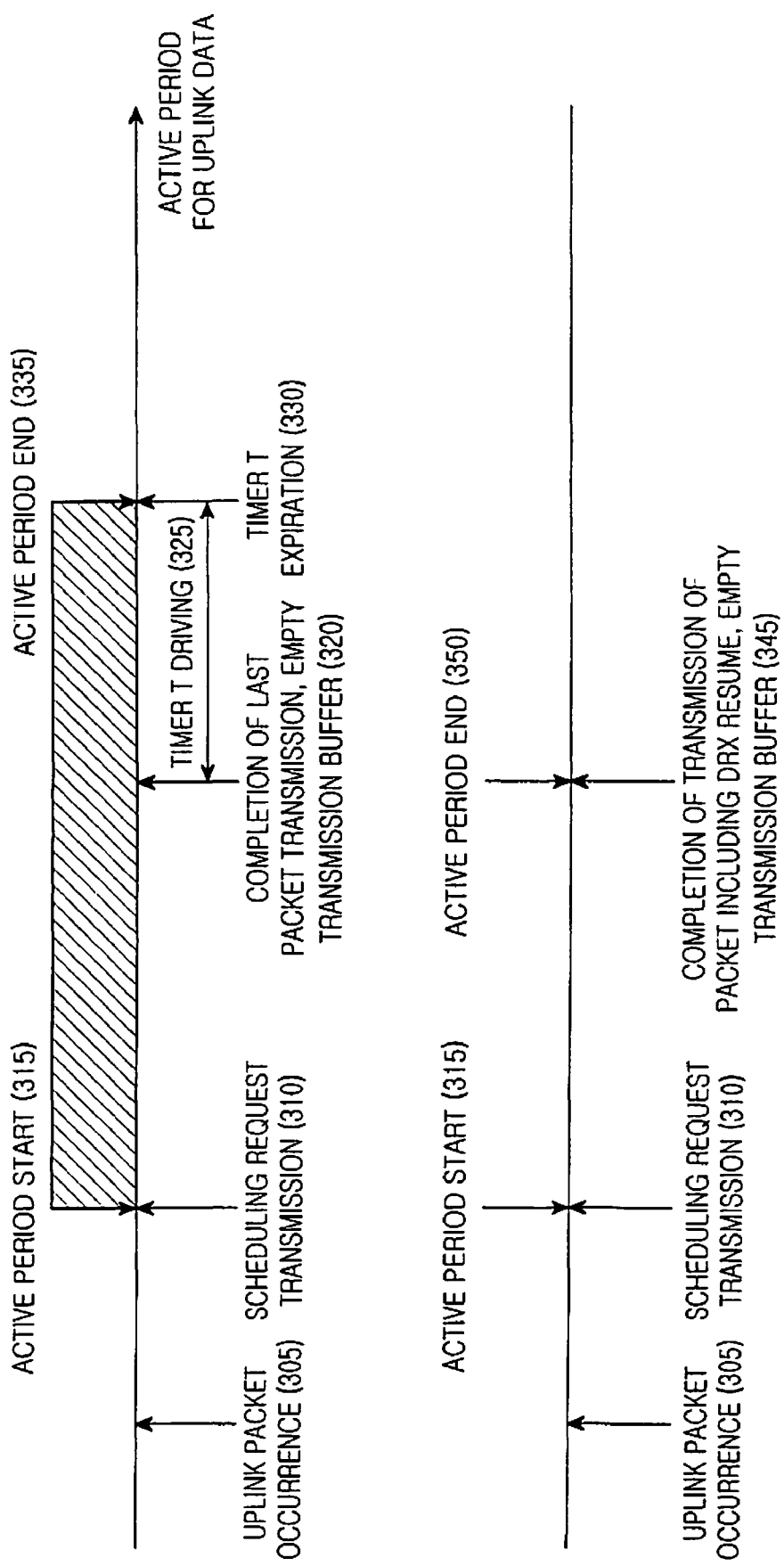
FIG. 3 is a diagram illustrating the overall DRX operation of a terminal that processes uplink data in accordance with an exemplary embodiment of the present invention.

FIG. 3 illustrates the overall operation of a User Equipment (UE) that controls a DRX operation according to an exemplary embodiment of the present invention.

In the following description, the fact that the UE transitions to an active state means that the UE turns on its transceiver. Also, the fact that the UE ends an active state means that the UE turns off its transceiver. Since the UE does not substantially perform the DRX operation when it is in an active state, the fact that the UE ends the active state has the same meaning as the fact that the UE resumes the DRX operation.

In the present invention, uplink data may be classified into two types, that is, uplink data that leads to downlink data reception, and uplink data that does not lead to downlink data reception.

As an example, the uplink data that leads to downlink data reception may be the last packet of data to which an ARQ of two layers is applied, and the uplink data that does not lead to downlink data reception may be data to which an ARQ is not applied. Here, the ARQ is a technique in which a receiving side checks the serial numbers of the received packets, and requests a transmitting side to retransmit packets that are not received.

With regard to this, in a typical ARQ protocol, such as Radio Link Control (RLC), a transmitting side transmits a series of packets, the last packet of which includes control information requesting a receiving side to report the reception status of the packets.

Such control information is referred to as a "POLL". On receiving a packet including the POLL, the receiving side transmits a reception status report message that includes the serial numbers of received packets and the serial numbers of packets required to be retransmitted.

If a UE transmits a packet including the POLL, the UE preferably maintains an active state because a reception status report message will be transmitted sooner or later from the UE.

Contrarily, if a UE receives the POLL, and transmits a reception status report message, the UE preferably ends an active state and resumes a DRX operation because packets are not transmitted/received any longer after the reception status report message is transmitted.

a. Embodiment 1

In a first embodiment of the present invention, when a UE transmits the last packet stored in a transmission buffer, the UE includes control information for informing an evolved Node B (ENB) of the end of an active state and the resumption of a DRX operation in an Media Access Control Packet Data Unit (MAC PDU) containing the last packet according to the type of the packet. When the UE completes transmitting the MAC PDU, the UE resumes the DRX operation.

According to the type of the packet, the UE transmits an MAC PDU that does not include control information for informing the ENB of the end of an active state and the resumption of a DRX operation, drives a timer when the transmission of the MAC PDU is completed, and maintains the active state until the timer expires. Since a UE determines whether or not to end an active state in this way, the UE can end the active state at the most appropriate time. Also, since the UE informs an ENB of the end of the active state, the ENB can prevent transmission resources from being allocated to UEs that are in a sleep state.

Referring to FIG. 3, if uplink data occurs in a UE performing a DRX operation, as designated by reference numeral "305", the UE reports a buffer status to an ENB, thereby requesting the ENB to allocate a transmission resource thereto, as designated by reference numeral "310". Also, the UE starts an active period during which it operates in an active state, as designated by reference numeral "315". The fact that the UE starts the active period has the same meaning as the fact that the UE suspends the DRX operation.

The UE monitors a downlink control channel. If the transmission resource is allocated to the UE, the UE transmits the uplink data by using the allocated transmission resource. That is, if the UE is allocated the transmission resource, the UE transmits the uplink data over the allocated transmission resource.

At a point of time when the UE transmits the last data stored in a transmission buffer, if the last data satisfies one of the following two DRX RESUME triggering conditions, the UE includes control information for informing the ENB of DRX operation resumption in an MAC PDU containing the last data, and transmits the MAC PDU with the control information included therein, as designated by reference numeral "345", and then resumes the DRX operation when the transmission of the MAC PDU is completed, as designated by reference numeral "350". That is, the UE ends the active period, and transitions to a sleep state.

The following are DRX RESUME triggering conditions:

[1] In the case where the transmission buffers of all other logical channels are empty, and the last data to be transmitted is stored in the transmission buffer of a logical channel to which ARQ is not applied.

[2] In the case where a reception status report message not including retransmission request information, that is, a reception status report message including only an ACK signal, is transmitted with the last data, and data including POLL information is not transmitted before the transmission of the last data or a reception status report message has been already received in response to data including POLL information, even if the data including POLL information has been transmitted.

If the last data stored in the transmission buffer satisfies neither of the DRX RESUME triggering conditions when the UE transmits the last data, the UE completes transmitting an MAC PDU containing the last data, as designated by reference numeral "320", and drives a timer T for a time "t", as designated by reference numeral "325".

If downlink data is not received until the timer T expires, the UE ends the active period, and transitions to a sleep state, as designated by reference numeral "335".

However, if downlink data is received before the timer T expires, the UE maintains the active period until the ENB instructs the UE to end the active period or data is received for another given period of time.

As mentioned above, in this embodiment, a UE informs a network of whether or not to resume a DRX operation when transmitting the last uplink data, and then maintains an active state or operates in a sleep state according to the DRX operation.

Figure 4:
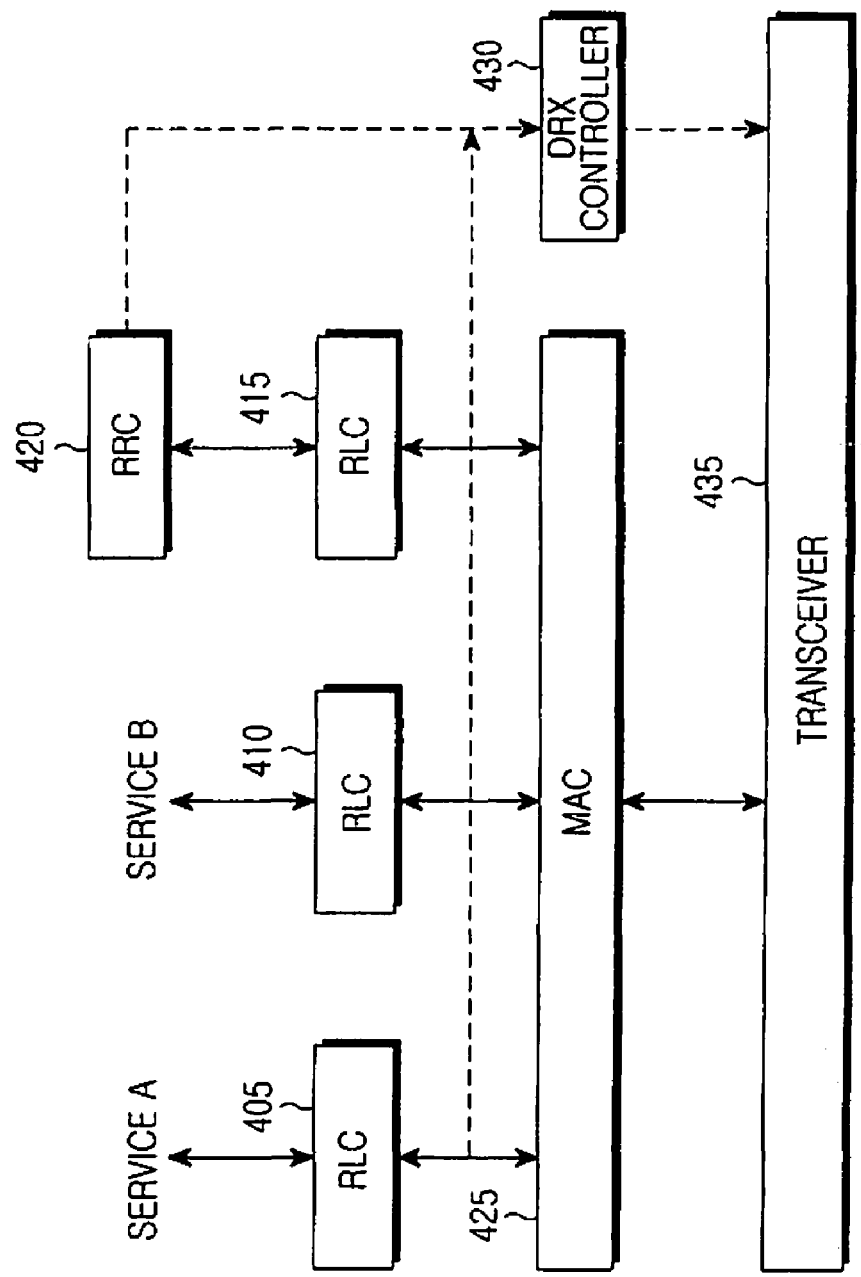
FIG. 4 is a block diagram illustrating a terminal apparatus in accordance with an exemplary embodiment of the present invention.

FIG. 4 illustrates a UE apparatus controlling a DRX operation according to an exemplary embodiment of the present invention.

Referring to FIG. 4, the UE apparatus includes a transceiver block 435, an MAC block 425, RLC blocks 405, 410, and 415, an RRC block 420, and a DRX controller block 430.

Each of the RLC blocks 405, 410, and 415 is created for each service, and functions to reconstruct a packet occurring in an upper layer into a size suitable for transmission over a radio frequency (RF) channel and to apply ARQ to the packet, if necessary.

Data transferred from any one of the RLC blocks 405, 410, or 415 to the MAC block 425 or data transferred from the MAC block 425 to any one of the RLC blocks 405, 410, or 415 is called a radio link control packet data unit (RLC PDU).

The MAC block 425 multiplexes packets configured in the RLC blocks 405, 410, and 415 into an MAC PDU and transmits the MAC PDU through the transceiver block 435, or demultiplexes RLC PDUs from an MAC PDU received through the transceiver block 435 and transfers the RLC PDUs to the corresponding RLC blocks 405, 410, and 415.

The transceiver block 435 transmits/receives generated uplink data over a physical channel.

The DRX controller block 430 controls a DRX operation according to DRX setup. That is, the DRX controller block 430 turns on the transceiver block 435 during an active period, and turns off the transceiver block 435 during a sleep period.

In other words, the DRX controller block 430 follows instructions of the RRL block 420, or controls the transceiver block 435 according to the characteristic of data generated in each of the RLC blocks 405, 410, and 415.

That is, when an RLC PDU transmitted in a specific RLC block is the last data to which ARQ is not applied, the DRX controller block 430 turns off the transceiver block 435. The DRX controller block 430 also turns off the transceiver block 435 in the case of a reception status report message not including retransmission request information.

The RRC block 420 controls the setup and release of various blocks related to wireless communication, including the RLC blocks 405, 410, and 415, the MAC block 425, the transceiver block 435, the DRX controller block 430, etc.

Figure 5:
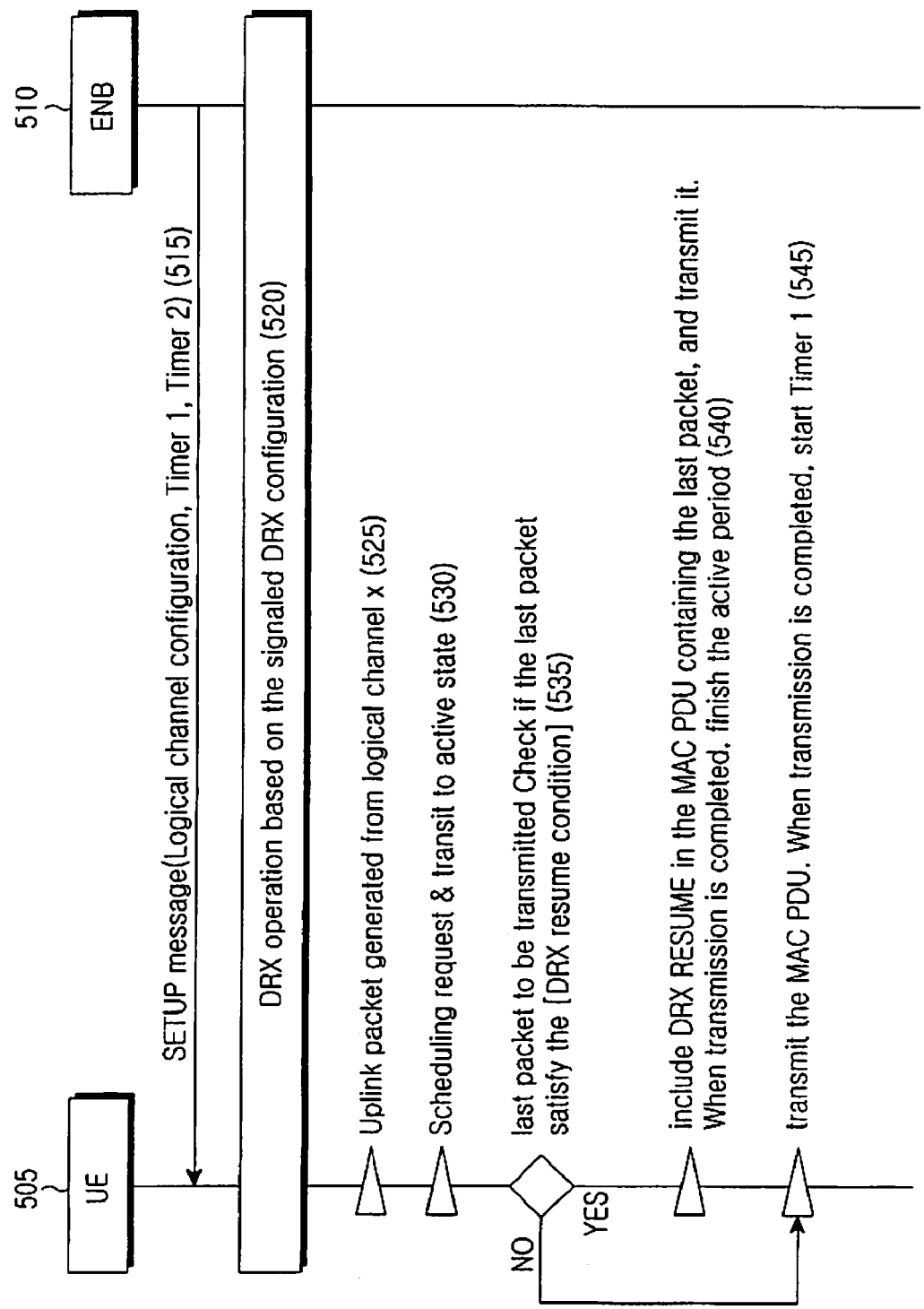
FIG. 5 is a diagram illustrating signaling flows and processing operations of F-a terminal and a base station in accordance with an exemplary embodiment of the present invention.

FIG. 5 illustrates signal flows between an ENB and a UE that variably maintain a DRX operation according to an exemplary embodiment of the present invention.

Referring to FIG. 5, in step 515, the UE 505 receives a SETUP message from the ENB (or an apparatus responsible for RF resource control in a network) 510.

The SETUP message configuration information of logical channels for providing the UE with desired services, for example, information related to various timers or variables used in RLC blocks. If the UE performs a DRX operation, the SETUP message also includes DRX setup information. For example, the SETUP message includes information on a DRX cycle length and its beginning point. Values of timer 1 and timer 2 are also included in the SETUP message.

According to setup information included in the SETUP message, an RLC block of the UE 505 transfers the logical timer values and the DRX setup information to a DRX controller block, sets up logical channels based on the configuration information according to logical channels, and transitions to a connection mode. That is, in the present invention, a network and a connection-mode UE for which logical channels are set up perform a DRX operation.

On completing the SETUP step, in step 520, the UE and the ENB perform the DRX operation according to the DRX setup information. In other words, the UE wakes up at a wakeup time set between the UE and the ENB, that is, transitions to an active state, and determines if data is received.

If data is not received for a certain time in the active state or the ENB instructs the UE to end the active period, the UE ends the active period and transitions to a sleep state again.

If downlink data to be transmitted to the UE arrives at the ENB, the ENB stores the downlink data until the active period of the closest UE reaches. When the active period starts, the ENB transmits the stored downlink data to the UE, and upon completing the transmission of the downlink data, instructs the UE to end the active period. The UE then transitions to a sleep state.

In step 525, the UE that is in the sleep state detects the occurrence of uplink data to be transmitted to the ENB over a logical channel.

In step 530, the UE reports a buffer status to a scheduler of the ENB so as to transmit the uplink data. That is, the UE requests the ENB to allocate a transmission resource for transmitting the uplink data, and transitions to an active state. In response to the buffer status report, the UE is allocated a transmission resource from the ENB over a downlink control channel, and transmits the uplink data over the allocated transmission resource.

In step 535, the UE that is transmitting the uplink data checks, prior to the transmission of the last data, if the last data satisfies any of the aforementioned DRX RESUME triggering conditions. That is, the UE checks if the last uplink data is the last data in the transmission buffer of a logical channel to which ARQ is not applied or if the last uplink data corresponds to a reception status report message not including retransmission request information.

When a result of the check in step 535 shows that the last uplink data satisfies any of the DRX RESUME triggering conditions, in step 540, the UE includes control information called DRX RESUME in an MAC PDU containing the last data, and transmits the MAC PDU with the DRX RESUME control information included therein. That is, in step 540, upon completing transmitting the MAC PDU, the UE ends the active period, and transitions to a sleep state. In other words, the UE resumes the DRX operation.

If a result of the check in step 535 shows that the last uplink data satisfies neither of the DRX RESUME triggering conditions, in step 545, the UE completes transmitting the MAC PDU containing the last data, and then drives timer 1. If downlink data is not received from the ENB until the timer 1 expires, the UE ends the active period, and transitions to a sleep state again.

Contrarily, if downlink data is received from the ENB before the timer 1 expires, the UE maintains the active period until any one of the DRX RESUME triggering conditions is satisfied.

The following are Conditions for ending an active state:
After the latest data is received, data is not received during timer 2.
The ENB instructs the UE to end the active period.

Here, the timer 1 is a timer that is driven for a time during which the UE can maintain power consumption to the full extent of its power, thereby maintaining an active state, and the timer 2 is a timer that is driven for a time set for maintaining an active state after downlink data is received from the ENB. The timers 1 and 2 are set to values at which a system operator can maintain optimal terminal power. Although the timers 1 and 2 are set to different values, the ENB and the UE may accord their DRX points with each other again by ending the active state at the same point of time.

Corresponding to such an operation of the UE, the ENB receives a buffer status report from the UE performing a DRX operation to thereby recognize that the UE suspends the DRX operation and maintains an active state. Also, the ENB allocates an appropriate transmission resource to the UE, as determined by a scheduler, and receives an MAC PDU containing DRX RESUME to thereby recognize that the UE resumes the DRX operation.

Even if the MAC PDU containing DRX RESUME is not received from the UE, the DRX operation is resumed when data is not received from the UE and there is no data to be transmitted to the UE for a given period of time.

The ENB may clearly instruct the UE to resume the DRX operation by transmitting to the UE an MAC PDU, which contains control information for informing the UE of the resumption of the DRX operation, and may also make the UE itself resume the DRX operation by transmitting no data to the UE for a certain period of time.

Figure 6:
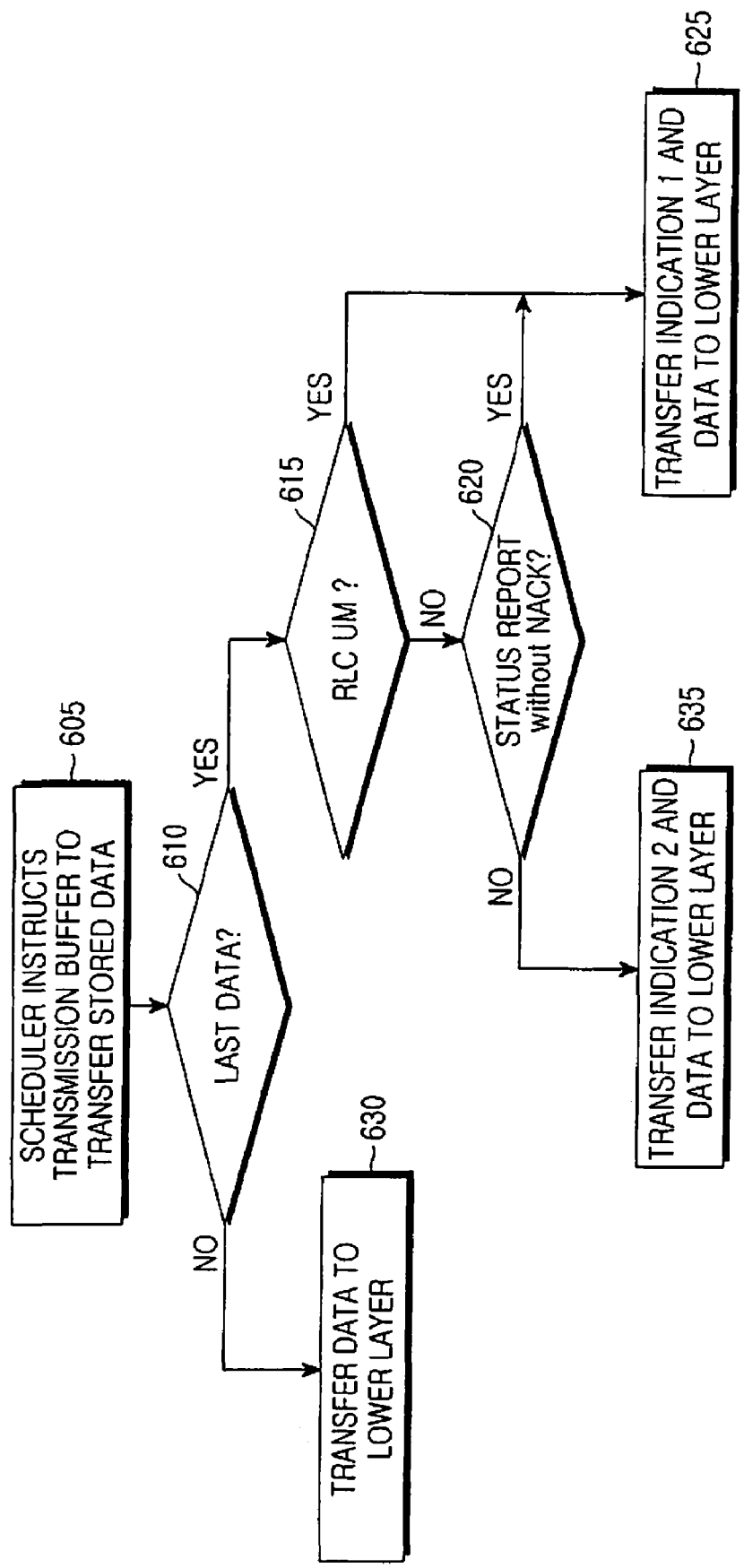
FIG. 6 is a flowchart illustrating an operation of an RLC block of a terminal apparatus in accordance with an exemplary embodiment of the present invention.

FIG. 6 illustrates the operation of the RLC block that variably controls an active state in the UE apparatus according to an exemplary embodiment of the present invention.

Referring to FIG. 6, in step 605, a scheduling layer inside of the UE instructs the RLC block to transfer data to the MAC block.

The RLC block proceeds to step 610, and determines if the transferred data is the last data stored in the transmission buffer. When the data is the last data, the RLC block proceeds to step 615, and otherwise, proceeds to step 630.

In step 630, the RLC block reconstructs the data stored in the transmission buffer into an RLC PDU with a size required by the scheduler, transfers the reconstructed RLC PDU to the MAC layer, and then waits for the next instruction from the scheduler.

Upon ascertaining that the data is the last data, in step 615, the RLC block checks if an ARQ procedure is performed for the data. If a result of the check in step 615 shows that the data is not subjected to the ARQ procedure, that is, an RLC Unacknowledged Mode (UM) is operated, the RLC block proceeds to step 625.

Contrarily, if a result of the check in step 615 shows that the data is subjected to the ARQ procedure, the RLC block proceeds to step 620.

In step 620, the RLC block checks if the last data satisfies the following indicator 1 triggering conditions.

The following are indicator 1 triggering conditions:
Status report message including retransmission request.
There is no POLL in response to which a response is not received. That is, any RLC PDU containing POLL has not been previously transmitted or a reception status report message in response to an RLC PDU containing POLL has been already received, even if the RLC PDU has been transmitted.

If a result of the check in step 620 shows that the last data satisfies all the indicator 1 triggering conditions, the RLC block proceeds to step 625. However, if the last data does not satisfy any one of the indicator 1 triggering conditions, the RLC block proceeds to step 635.

In step 625, the RLC block configures the last data into an RLC PDU, and transfers the RLC PDU together with indicator 1 to a lower layer. The indicator 1 indicates that the RLC PDU transferred therewith is the last data satisfying the DRX RESUME triggering condition. That is, ARQ is not performed for the last data, which corresponds to data that does not lead to downlink data reception. Thus, the UE transmits the last data together with the DRX RESUME, and resumes the DRX operation when the transmission of the last data is completed.

Contrarily, in step 635, the RLC block configures the last data into an RLC PDU, and transfers the RLC PDU together with indicator 2 to a lower layer. The indicator 2 indicates that the RLC PDU transferred therewith is the last data that does not satisfy the DRX RESUME triggering condition. This corresponds to a situation where downlink data reception is considered necessary during a set timer. Thus, upon completing the transmission of the last data, the UE determines a time for DRX operation resumption by driving a given timer.

Figure 7:
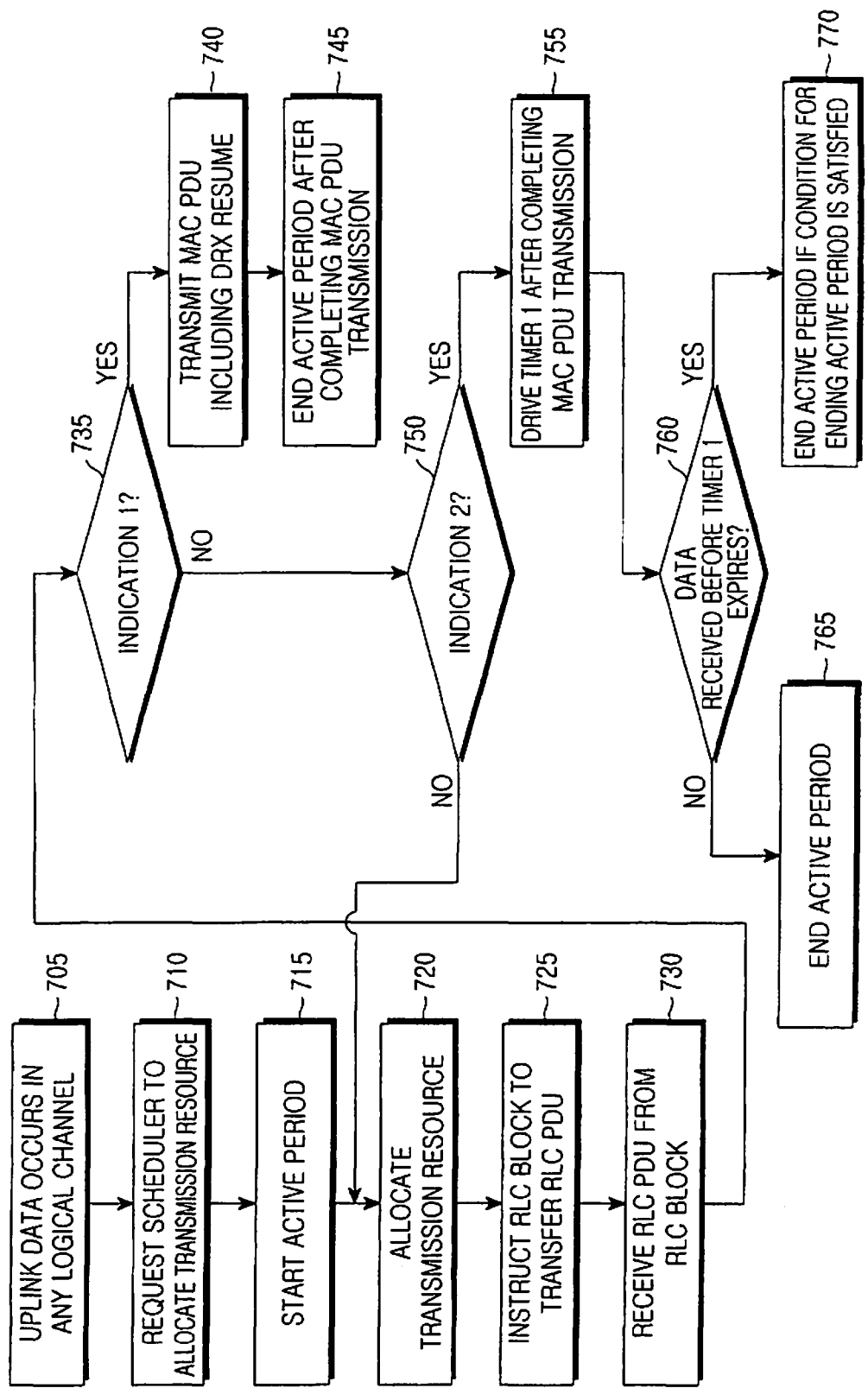
FIG. 7 is a flowchart illustrating operations of an MAC block and a DRX controller block of a terminal apparatus in accordance with an exemplary embodiment of the present invention.

FIG. 7 illustrates the operations of the MAC block and the DRX controller block of the UE apparatus according to an exemplary embodiment of the present invention.

Referring to FIG. 7, in step 705, uplink data occurs in any logical channel transmission buffer of the UE to which a DRX operation is applied.

In step 710, the MAC block requests a scheduler of an ENB to allocate a transmission resource thereto. With regard to this, the MAC block reports the buffer status for the data occurring in the transmission buffer to the ENB, thereby requests the scheduler of the ENB to allocate a transmission resource necessary for transmitting the data. Also, in step 715, the DRX controller block controls the transceiver block to start an active period.

When the transmission resource is allocated to the UE in step 720, in step 725, a scheduler of the MAC block instructs the RLC block to configure an RLC PDU with a size transmittable over the allocated transmission resource, and transfer the configured RLC PDU to the MAC block.

When the RLC PDU reaches the MAC block in step 730, in step 735, the DRC controller block checks if indicator 1 is transferred together with the RLC PDU.

In other words, the DRX controller block checks if the RLC PDU is the last data and is a reception status report message not including a retransmission request or RLC UM data.

If a result of the check in step 735 shows that the indicator 1 is transferred together, the DRX controller block proceeds to step 740, and otherwise, proceeds to step 750.

In step 740, the DRX controller block controls the MAC block to include control information, DRX RESUME, in an MAC PDU containing the RLC PDU, and transmit the MAC PDU with the control information included therein. The DRX RESUME control information may be implemented as a type of MAC control information. For example, referring to FIG. 8, an indicator 810 indicating existence/non-existence of the RESUME control information is included in an MAC header. If the DRX RESUME needs to be transmitted, the indicator 810 is set to an appropriate value, and the DRX RESUME 820 may be included in the rear portion of the MAC PDU.

Upon receiving the DRX RESUME control information, the ENB recognizes that the relevant UE resumes the DRX operation, and thus does not allocate a transmission resource or transmits data to the UE until the next active period.

In step 745, the DRX controller block ends the active period when the transmission of the MAC PDU is completed, and controls the transceiver block to enter a sleep period. In other words, the DRX operation is resumed.

In step 750, the DRC controller block checks if the RLC PDU is transferred together with indicator 2. The fact that the indicator 2 is transferred together means that the DRX operation must not be resumed immediately because the RLC PDU is the last data, but data may be received from the ENB after the RLC PDU is transmitted. Consequently, the DRX controller block proceeds to step 755 when the indicator 2 is transferred together, and proceeds to step 720 when the indicator 2 is not transferred together because this means that data to be transmitted still remains in the RLC transmission buffer.

In step 755, the MAC block transmits the MAC PDU, and the DRC controller block drives timer 1 and proceeds to step 760 when the transmission of the MAC PDU is completed.

In step 760, the DRX controller block determines if downlink data is received before the timer 1 expires. If a result of the determination in step 760 shows that downlink data is not received before the timer 1 expires, the DRX controller block proceeds to step 765, and ends the active period and resumes the DRX operation.

Contrarily, if a result of the determination in step 760 shows that downlink data is received before the timer 1 expires, the DRX controller block proceeds to step 770, and maintains the active period until the condition for ending the active period is satisfied. If the condition for ending the active period is satisfied, then the DRX controller block resumes the DRX operation.

Figure 8:
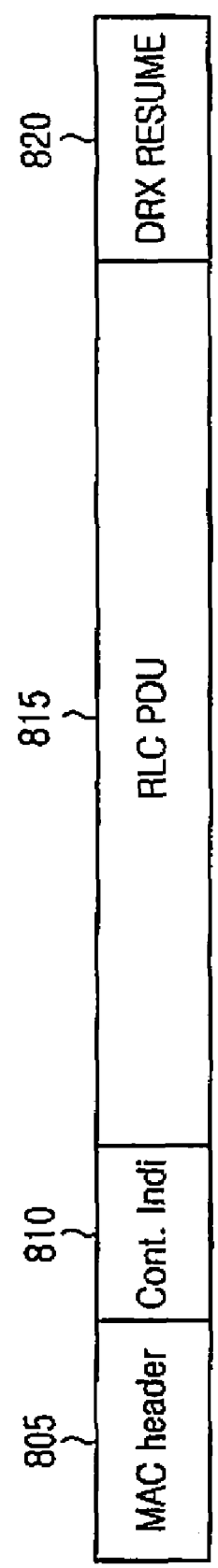
FIG. 8 is a diagram illustrating a structure of an MAC PDU in accordance with an exemplary embodiment of the present invention.

FIG. 8 illustrates the structure of an MAC PDU according to an exemplary embodiment of the present invention.

Referring to FIG. 8, the MAC block configures the MAC PDU by including an MAC header 805 together with control information called DRX RESUME 820 in an RLC PDU transferred from the RLC block. With regard to this, the MAC PDU may further include an indicator 810 indicating whether or not the DRX RESUME control information 820 exists. That is, on one hand, the indicator 810 that is set to 1 indicates that the RLC PDU corresponds to information for triggering the DRX RESUME according to the present invention, and on the other hand, the indicator 810 that is set to 2 indicates that an active state is maintained for a time defined by a timer, and then the DRX RESUME is triggered.

b. Embodiment 2

In a second embodiment of the present invention, there is provided a method for a UE performing a DRX operation to resume the DRX operation while adjusting the DRX cycle length thereof according to the characteristic of the last uplink data when resuming the DRX operation that has been temporarily suspended for the transmission of uplink data.

Figure 9:
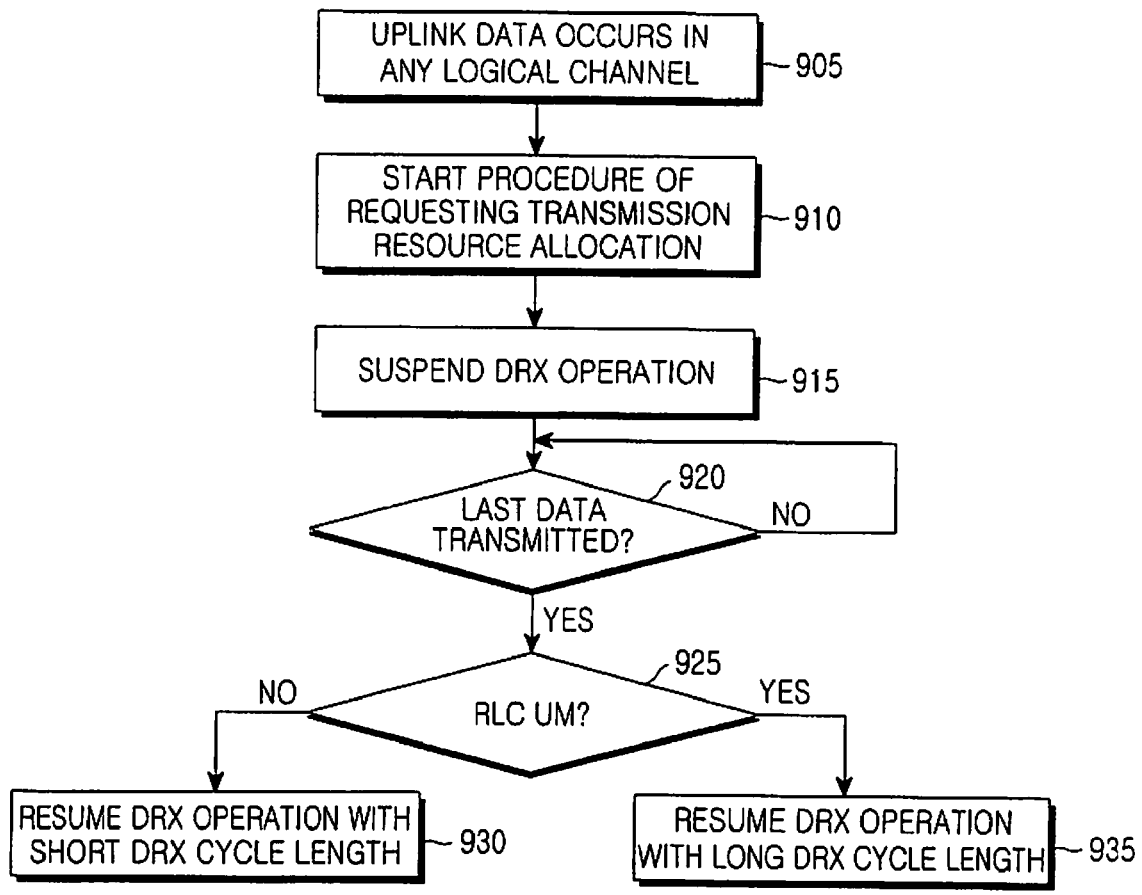
FIG. 9 is a flowchart illustrating an operation of a terminal in accordance with a second exemplary embodiment of the present invention.

FIG. 9 illustrates the operation of a UE according to the second embodiment of the present invention.

Referring to FIG. 9, in step 905, uplink data occurs in any logical channel transmission buffer of the UE to which the DRX operation is applied.

In step 910, the UE requests a scheduler of an ENB to allocate a transmission resource for reporting the status of the transmission buffer. More specially, the UE reports a buffer status for the data occurring in the transmission buffer to the ENB through the following three steps, thereby requesting the scheduler of the ENB to allocate a transmission resource necessary for transmitting the data.

A procedure of requesting transmission resource allocation may be performed in the following three steps. Once the UE begins the procedure, that is, the UE transmits a transmission resource allocation signal to the ENB over a given physical channel, it suspends the DRX operation immediately, and starts an active period.

The steps are as follows:

1. The UE requests the ENB to allocate a transmission resource for a buffer status report over a given physical channel.

2. The ENB allocates the transmission resource for a buffer status report to the UE.

3. The UE report a buffer status to the ENB by using the allocated transmission resource.

Once the UE begins on the procedure of requesting transmission resource allocation, as mentioned above, the UE transmits a transmission resource allocation signal to the ENB over a given physical channel, in step 915, the UE suspends the DRX operation immediately, and starts an active period.

Upon suspending the DRX operation, the UE monitors a downlink control channel, and transmits the uplink data when the transmission resource is allocated to the UE over the downlink control channel.

The UE repeatedly performs an operation of transmitting the uplink data by using the allocated transmission resource until the transmission of the last data is completed.

In step 920, if the transmission of the last data is completed, and the UE determines that the ENB recognizes the transmitted data to be the last data, the UE proceeds to step 925.

Although not illustrated in the drawing, when there is no more data to be transmitted, the UE transmits the uplink data while adding meaningless data, that is, padding, thereto. Thus, in transmitting the last data, the UE inserts padding into the last data when the quantity of the allocated transmission resource is greater than the last data, thereby indirectly informing the ENB that there is no more data to be transmitted.

When the UE can add padding to the last data to thereby inform the ENB that the transmission buffer is empty, the UE proceeds to step 925 immediately after transmitting the last data.

Contrarily, if the quantity of the allocated transmission resource exactly accords with the last data, the UE cannot inform the ENB that there is no more data to be transmitted, and there is a high possibility that the ENB allocates a transmission resource to the UE later on. Therefore, although the UE transmits the last data, it does not proceed to step 925, but maintains the active period if it does not insert padding or information indicative of the last data into the last data. That is, the UE does not proceed to step 925 before it is allocated a transmission resource later on to thereby transmit information on the non-existence of transmitted data to the ENB.

In step 925, the UE determines the characteristic of the last data, thereby deciding which DRX cycle length is applied to the DRX operation.

When the last data is data occurring in a logical channel to which ARQ is not applied, or when the last data is data occurring in a logical channel to which ARQ is applied, but corresponds to a reception status report message not including retransmission request information, the UE proceeds to step 935, and otherwise, proceeds to step 930.

In step 930, the UE resumes the DRX operation, and applies a predefined first DRX cycle length as the DRX cycle length of the resumed DRX operation. In step 935, the UE resumes the DRX operation, and applies a predefined second DRX cycle length as the DRX cycle length of the resumed DRX operation.

The ENB signals the first and second DRX cycle lengths to the UE during a call setup procedure, and the first DRX cycle length has a value less than that of the second DRX cycle length.

c. Embodiment 3

In a third embodiment of the present invention, there is a method and apparatus for determining whether a UE resumes a DRX operation immediately after transmitting the last data or resumes the DX operation after waiting for a given period of time according to the type of a logical channel to which the last data transmitted by the UE belongs.

Figure 10:
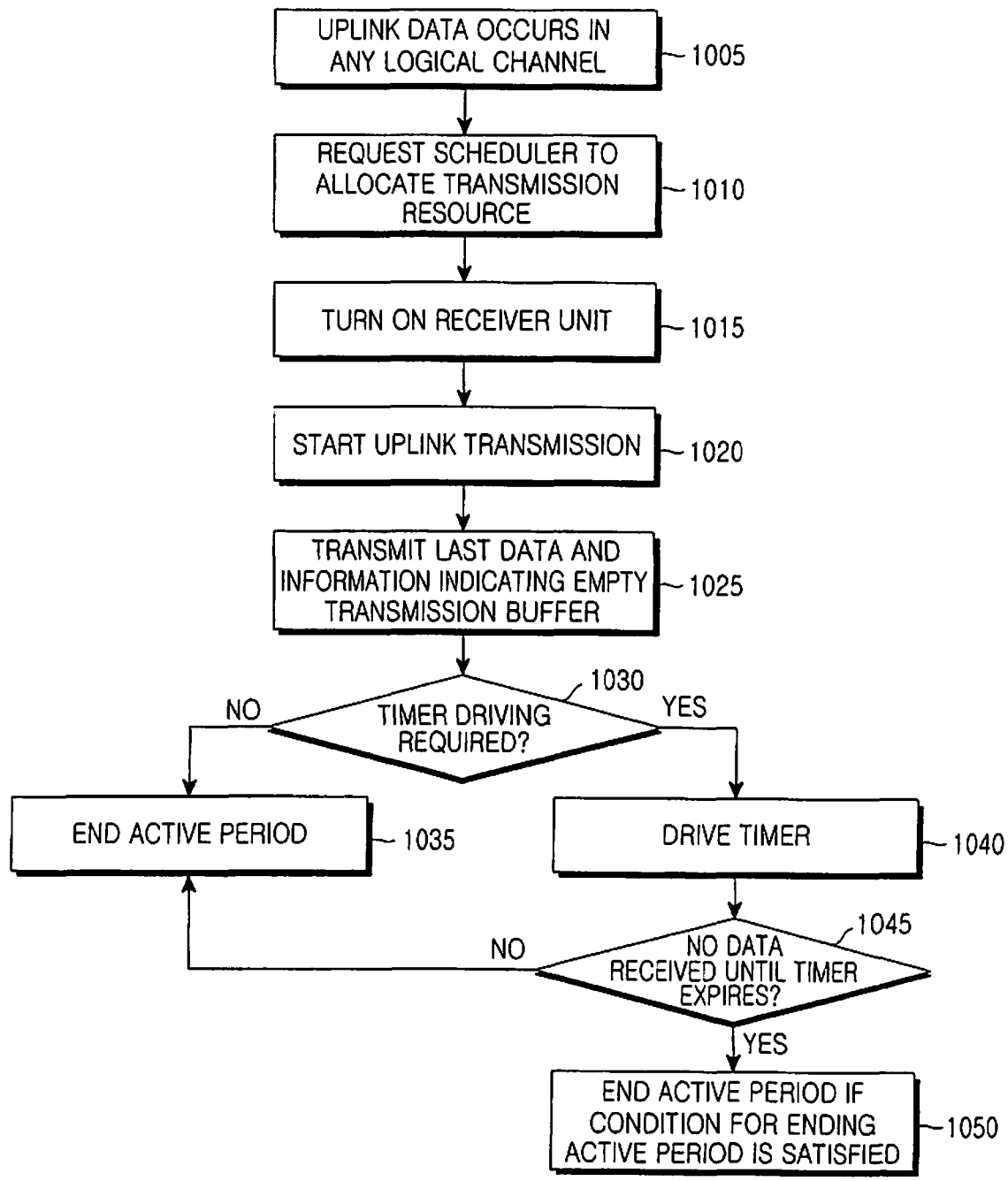
FIG. 10 is a flowchart illustrating an operation of a terminal in accordance with a third exemplary embodiment of the present invention.

FIG. 10 illustrates the operation of a UE according to the third embodiment of the present invention.

Before the UE performs the operation illustrated in FIG. 10, the UE together with an ENB determines according to logical channels whether or not to drive a timer after transmitting the last data or information indicating that there is no more data to be transmitted, and recognizes timer values to be applied according to logical channels. This information is indicated to the UE and the ENB through a call setup procedure, etc. For example, a logical channel to which ARQ is applied may be set in such a manner as to drive the timer, and a logical channel to which ARQ is not applied may be set in such a manner as not to drive the timer.

Referring to FIG. 10, in step 1005, uplink data occurs in any logical channel transmission buffer of the UE performing the DRX operation.

In step 1010, the UE requests a scheduler of the ENB to allocate a transmission resource thereto. Subsequently, in step 1015, the UE drives its receiver unit, and then monitors if a transmission resource is allocated to the UE over a downlink control channel. If the UE is allocated an uplink transmission resource, in step 1020, the UE begins on uplink transmission over the allocated transmission resource, and continues the uplink transmission until no more data remains in the transmission buffer. In step 1025, the UE transmits information indicating that there is no more data to be transmitted, after successfully transmitting the last data or while transmitting the last data. Upon completing the transmission of the information indicating that there is no more data to be transmitted, the UE proceeds to step 1030, and checks if the logical channel is a logical channel that is set in such a manner as to drive a timer after the transmission of the information indicating that there is no more data to be transmitted.

If a result of the check in step 1030 shows that the logical channel is not a logical channel requiring driving the timer, in step 1035, the UE ends the active period that has been started for the transmission of the uplink data, and resumes the DRX operation. That is, the UE continues the active period when the corresponding point of time falls within an active period on the existing DRX operation, and turns off its receiver unit and waits until the next active period reaches when the corresponding point of time does not fall within an active period on the existing DRX operation.

However, if a result of the check in step 1030 shows that the logical channel is a logical channel requiring driving the timer, in step 1040, the UE drives the timer. Subsequently, the UE proceeds to step 1045, and checks if there is data transmitted thereto until the timer expires.

If a result of the check in step 1045 shows that data is not received until the timer expires, the UE proceeds to step 1035, and ends the active period and returns to the previous DRX operation. However, if a result of the check in step 1045 shows that data is received to the UE before the timer expires, the UE proceeds to step 1050, and maintains the active period until the condition for ending the active period is satisfied. When the condition for ending the active period is satisfied, the UE ends the active period, and resumes the DRX operation.

d. Embodiment 4

In a fourth embodiment of the present invention, there is provided a method and apparatus for resuming a DRX operation after a UE transmits the last data or information indicating that there is no more data to be transmitted, on condition that the DRX cycle length of the DRX operation to be resumed is determined according to the type of a logical channel to which the last data belongs.

Figure 11:
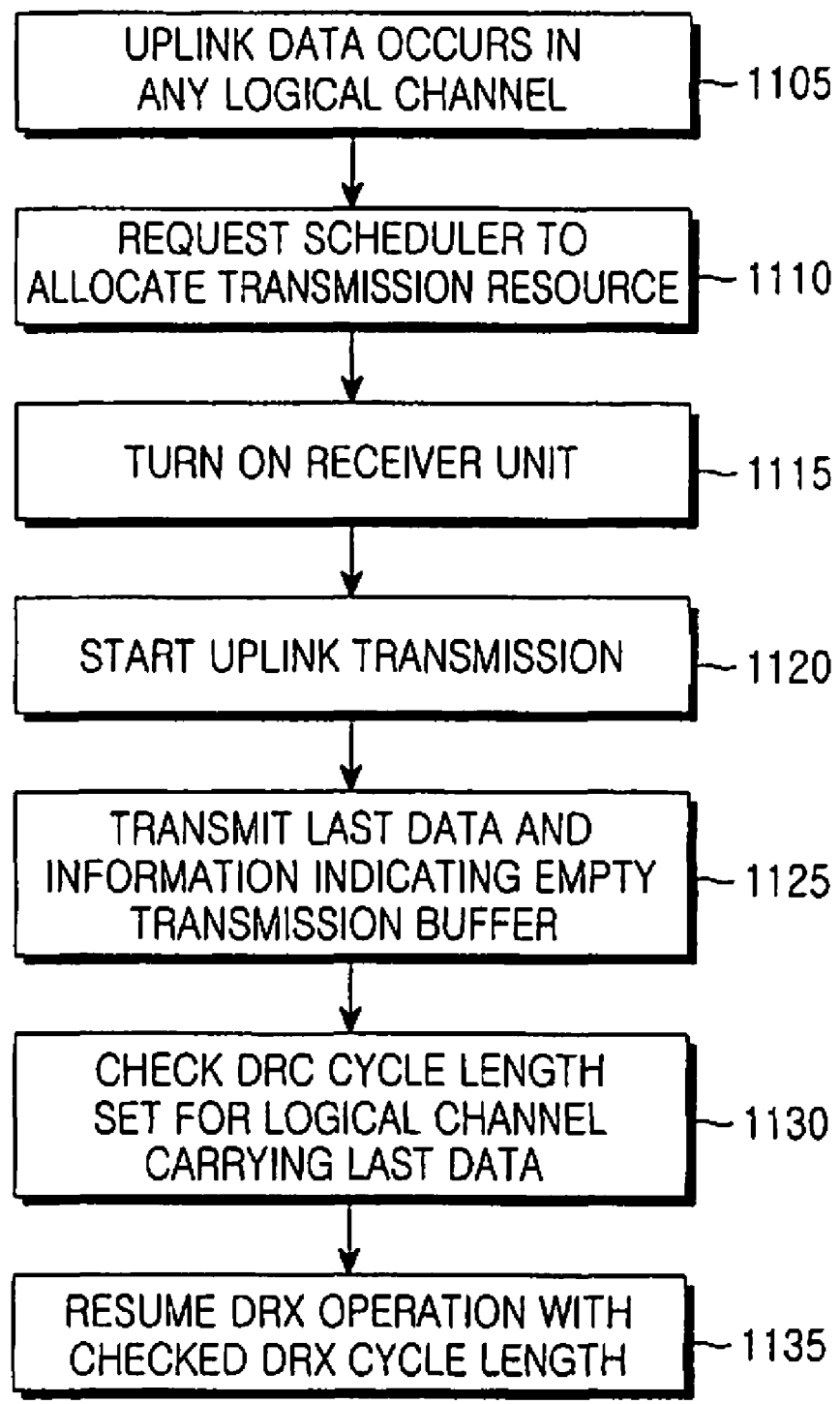
FIG. 11 is a flowchart illustrating an operation of a terminal in accordance with a fourth exemplary embodiment of the present invention.

FIG. 11 illustrates the operation of a UE according to the fourth embodiment of the present invention.

Before the UE performs the operation illustrated in FIG. 11, the UE together with an ENB recognizes a DRX cycle length to be applied to a DRX operation that is resumed after transmitting the last data or information indicating that there is no more data to be transmitted. This information is indicated to the UE and the ENB through a call setup procedure, etc. For example, a first DRX cycle length corresponding to a shorter DRX cycle length may be set for a logical channel to which ARQ is applied, and a second DRX cycle length corresponding to a longer DRX cycle length may be set for a logical channel to which ARQ is not applied.

Referring to FIG. 11, in step 1105, uplink data occurs in any logical channel transmission buffer of the UE performing the DRX operation.

In step 1110, the UE requests a scheduler of the ENB to allocate a transmission resource thereto. Subsequently, in step 1115, the UE turns on its receiver unit, and then monitors if a transmission resource is allocated to the UE over a downlink control channel. If the UE is allocated an uplink transmission resource, in step 1120, the UE begins on uplink transmission over the allocated transmission resource, and continues the uplink transmission until no more data remains in the transmission buffer. In step 1125, the UE transmits information indicating that there is no more data to be transmitted, after successfully transmitting the last data or while transmitting the last data. Upon completing the transmission of the information indicating that there is no more data to be transmitted, in step 1130, the UE checks if the DRX cycle length set for the logical channel to which the last data belongs is the first DRX cycle length or the second DRX cycle length. In step 1135, the UE ends the active period that has been started for the transmission of the uplink data, and resumes the DRX operation by using the first or second DRX cycle length.

c. Embodiment 5

In a fifth embodiment of the present invention, there is provided a way to drive a timer for controlling DRX operation resumption at a time point when a UE is allocated a transmission resource over which to transmit information indicating that there is no more data to be transmitted, rather than at a point in time when the transmission of the information indicating that there is no more data to be transmitted is completed. This embodiment has an advantage of making a downlink DRX operation as similar as possible to an uplink DRX operation.

Figure 12:
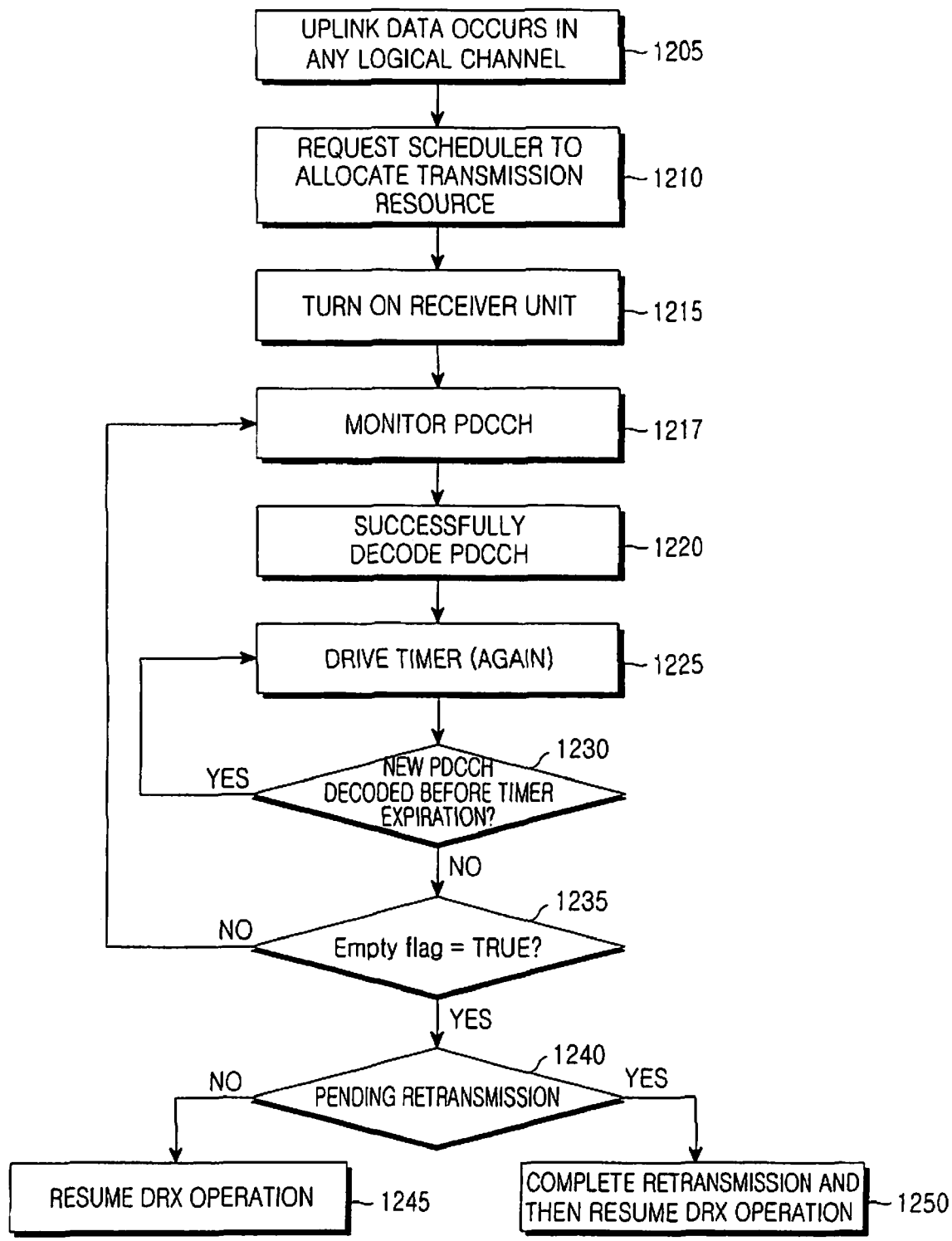
FIG. 12 is a flowchart illustrating an operation of a terminal in accordance with a fifth exemplary embodiment of the present invention

FIG. 12 illustrates the operation of a UE according to the fifth embodiment of the present invention.

Referring to FIG. 12, in step 1205, uplink data occurs in any logical channel transmission buffer of the UE performing the DRX operation.

In step 1210, the UE requests a scheduler of an ENB to allocate a transmission resource thereto, and in step 1215, turns on its receiver unit. In step 1217, the UE monitors a Physical Downlink Common Control CHannel (PDCCH). That is, the UE receives time/frequency resources mapped to the PDCCH, and performs UE-specific Cyclic Redundancy Check (CRC). If a result of the UE-specific CRC shows no error, this result means that control information to be delivered to the UE, for example, information on downlink transmission resource allocation or uplink transmission resource allocation, is included in the PDCCH. Contrarily, if a result of the UE-specific CRC shows any error, this result means that control information to be delivered to the UE is not included the PDCCH.

In step 1220, if the UE succeeds in decoding the PDCCH, in other words, if the UE receives the PDCCH that has no error in the UE-specific CRC, the UE proceeds to step 1225, and drives a given timer. The UE checks if a new PDCCH is successfully decoded until the timer expires. If a new PDCCH is not successfully decoded until the timer expires, that is, if the UE is not allocated a downlink or uplink transmission resource again until the timer expires, the UE proceeds to step 1235 so as to determine if it is necessary to resume the DRX operation. Contrarily, if a new PDCCH is successfully decoded before the timer expires, the UE returns to step 1225, and drives the timer again.

In step 1235, if the transmission buffer is empty, the UE checks if it has already started transmitting an MAC PDU that includes information indicating no more data to be transmitted. When the UE starts transmitting the MAC PDU including the last data and the information indicating no more data to be transmitted, it sets an Empty Flag to "TRUE". In step 1235, if the Empty Flag is set to "TRUE", the UE proceeds to step 1240. However, if the Empty Flag is set to "FALSE", that is, if data still remains in the transmission buffer of the UE or the UE does not yet start transmitting the information indicating no more data to be transmitted, the UE returns to step 1215, and continues to monitor the PDCCH. The fact that the UE proceeds to step 1240 means that no data remains in the transmission buffer of the UE, and the transmission of the information indicating no more data to be transmitted has been already completed or is in progress. Thus, in step 1240, the UE checks if there is data that is under uplink HARQ retransmission. If there is no data is under uplink HARQ retransmission, the UE immediately resumes the DRX operation. Contrarily, if there is data that is under uplink HARQ retransmission, the UE completes the HARQ retransmission, that is, performs retransmission until an HARQ ACK is received or the given maximum number of times of retransmission reaches, and then resumes the DRX operation.

According to the present invention as described above, when a UE transmits uplink data, the UE variably controls given active and sleep periods in consideration of whether or not retransmission for the uplink data is performed, thereby allowing a DRX operation to be more flexibly used.

Further, the power consumption of a UE can be minimized by maintaining an active period to a variable length corresponding to the characteristic of uplink transmission data.

Further, since a UE informs a network of its active and sleep states corresponding to a DRX mode, it is possible to for the network to ensure the reliability and efficiency of transmission resource allocation according to uplink data transmission/reception.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of transmitting uplink data by a terminal performing a Discontinuous Reception (DRX) operation in a mobile telecommunication system, the method comprising the steps of:
   as the uplink data occurs during the DRX operation, sending a scheduling request for requesting uplink resources for the uplink data and transitioning to an active state;
   transmitting the uplink data when the uplink resources are allocated;
   maintaining the active state during a first period after the uplink sources are allocated;
   maintaining the active state during a second period if downlink data is received during the first period; and
   ending the active state if the second period is over or a command for ending the active state is received and resuming the DRX operation.

2. The method as claimed in claim 1, wherein transmitting the uplink data comprises:
   Monitoring a downlink control channel; and transmitting the uplink data over the uplink resource allocated through the downlink control channel.

3. A method of transmitting uplink data by a terminal performing a Discontinuous Reception (DRX) operation in a mobile telecommunication system, the method comprising the steps of:
- as the uplink data occurs during the DRX operation, sending a scheduling request for requesting uplink resources for the uplink data and transitioning to an active state;
- transmitting the uplink data when the uplink resources are allocated;
- if one of predetermined DRX resume triggering conditions is satisfied while the uplink data is transmitted, transmitting the uplink data including control information for requesting the DRX to resume; and
- resuming the DRX operation immediately.

4. The method as claimed in claim 3, wherein the DRX resume triggering conditions are that a transmission buffer is empty, and the last data to be transmitted is stored in the transmission buffer of a logical channel to which Automatic Repeat Request (ARQ) is not applied or that the terminal transmits a reception status report message not including retransmission request information.

* * * * *